United States Patent
Schantz et al.

(10) Patent No.: US 8,111,988 B1
(45) Date of Patent: Feb. 7, 2012

(54) METHOD FOR MONITORING WAVELENGTH-DIVISION MULTIPLEXED SIGNAL

(75) Inventors: Howard J. Schantz, Inver Grove Heights, MN (US); Brian L. Uhlhorn, St. Paul, MN (US)

(73) Assignee: Lockheed Martin Corporation, Bethesda, MD (US)

(*) Notice: Subject to any disclaimer, the term of this patent is extended or adjusted under 35 U.S.C. 154(b) by 813 days.

(21) Appl. No.: 12/136,249

(22) Filed: Jun. 10, 2008

(51) Int. Cl.
*H04B 10/08* (2006.01)
*H04B 17/00* (2006.01)

(52) U.S. Cl. .......... 398/34; 398/25; 398/26; 398/27; 398/28; 398/29; 398/30; 398/31; 398/32; 398/33

(58) Field of Classification Search .................. None
See application file for complete search history.

(56) References Cited

U.S. PATENT DOCUMENTS

| | | | | |
|---|---|---|---|---|
| 4,583,161 A * | 4/1986 | Gunderson et al. | | 714/52 |
| 6,271,944 B1 * | 8/2001 | Schemmann et al. | | 398/196 |
| 6,344,910 B1 * | 2/2002 | Cao | | 398/34 |
| 6,577,786 B1 * | 6/2003 | Cappiello et al. | | 385/24 |
| 6,611,546 B1 * | 8/2003 | Garnache et al. | | 372/92 |
| 6,975,395 B1 * | 12/2005 | Gentieu et al. | | 356/326 |
| 7,315,370 B2 * | 1/2008 | Barwicz et al. | | 356/326 |
| 2007/0024957 A1 * | 2/2007 | Charlet et al. | | 359/334 |

* cited by examiner

*Primary Examiner* — Kenneth N Vanderpuye
*Assistant Examiner* — Darren E Wolf
(74) *Attorney, Agent, or Firm* — Hamre, Schumann, Mueller & Larson, P.C.

(57) ABSTRACT

A method for monitoring wavelength-division multiplexed (WDM) signal for detecting signal drift of objective signals, including generation of one or more objective signals and a guard signal. The guard signal has a wavelength that is within a range defined by a guard channel. The first and second objective signals and the guard signal are wavelength-division multiplexed to generate a wavelength-division multiplexed signal. The first objective signal, the second objective signal, and the guard signal are assigned to a first multiplexed objective channel, a second multiplexed objective channel, and a multiplexed guard channel, respectively. The wavelength-division multiplexed signal is received by a monitor and then the error rate of the multiplexed guard channel is determined.

9 Claims, 8 Drawing Sheets

METHOD FOR MONITORING WAVELENGTH-DIVISION MULTIPLEXED SIGNAL

FIELD

This description relates generally to detecting signal drift of a wavelength-division multiplexed signal by providing and monitoring a wavelength-division multiplexed signal.

BACKGROUND

Electromagnetic radiation signals can be undesirably affected by signal drift. Generally, signal drift, also known as frequency drift, is an unintended offset of a signal's carrier frequency from its nominal frequency. Because of the inverse relationship between frequency and wavelength, frequency offset can be described using a wavelength of the signal. There are several causes for signal drift. For example, changes in temperature that can affect components of a system or overall breakdown of components leading to system failure can cause signal drift.

Signal drift can be particularly problematic if there are multiple signals sent at different wavelengths along the same connection. For example, optical signals having different carrier frequencies may be communicated along the same optical fiber. For example, a wavelength-division multiplexed signal uses different and discrete wavelength channels to communicate multiple sets of data along an optical fiber. When a signal drifts in a wavelength-division multiplexed signal, a signal drift of one channel, or wavelength, can cause that channel to drift into its adjacent channel causing interference. For optical signals, interference is caused by leaking photons from the drifting channel to another channel. Such interference can cause significant noise in a channel. Noise causes error rates of a signal or channel. Generally, it is desirable to minimize error rates of a signal or channel. A prolonged interference or substantial amount of interference can lead to unacceptable rise in the error rate. Increased error rate can lead to the total loss of data on the channel.

Wavelength-division multiplexing is a technique that multiplies signals so that multiple signals are carried together along a same fiber, each of the signals separated at different wavelengths or channels on the multiplexed signal. Wavelength-division multiplexing may be used to construct various types of networks. A ring topology network and a star topology network are just two of several known network topologies which can be created to utilize wavelength-division multiplexing to generate a multiplexed signal. A star topology network has a central hub and various nodes connected to the central hub with multiple inputs and outputs. Each node may generate a signal that is sent to the central hub, where the multiple signals are wavelength-division multiplexed and the multiplexed signals are sent back to the individual nodes. Accordingly, each of the nodes may detect the multiplexed signal, which generally allows each individual node to see the signals from all of the other nodes via the channels of the multiplexed signal. A passive star coupler is a star coupler that does not require any additional power to wavelength-division multiplex signals to generate a multiplexed signal. A ring topology may wavelength-division multiplex signals of multiple nodes in a serial fashion, wherein signals from each node are wavelength-division multiplexed at the leg of the ring topology from node to node, that can ultimately lead to a complete multiplexed signal at a leg of the ring topology.

For a system that uses multiple signals using multiple wavelengths along the same optical fiber, it would be advantageous to be able to detect signal drift. One possible method is to use a spectrum analyzer. A spectrum analyzer is used to examine the spectral composition of the optical waveform. For example, a spectrum analyzer can calculate a Fourier transform of a signal, resulting in a waveform in a power spectrum, wherein different frequency components of the waveform are shown as separate bands or channels over a given frequency range. Power or magnitude of each frequency component may also be shown in the power spectrum. However, there are several disadvantages of using a spectrum analyzer. Spectrum analyzers require expensive equipment and may not be able to be integrated into some systems or solutions. Further, because of signal-to-noise ratios, spectrum analyzers use long acquisition times and signal processing methods such as signal averaging. Further, the Nyquist frequency limit also may hinder perfect reconstruction of the signals from the waveform. To resolve this issue, further steps may be required, such as using different filters and oversampling. Further, use of these techniques may cause ghost signals, wherein certain frequency components are included in the output but were not part of the original signal.

Accordingly, improved methods for detecting signal drift are desirable.

BRIEF SUMMARY

This description relates to a method for monitoring wavelength-division multiplexed (WDM) signal. Embodiments disclosed herein relate to a system and a method for monitoring a WDM guard signal. Embodiments disclosed herein relate to a method for determining signal drift of objective signals by providing and monitoring a guard channel of a WDM signal.

In one embodied method for monitoring a WDM signal, one or more guard signals are generated, each guard signal including a guard wavelength $\lambda_g$, and a predetermined guard power amplitude $A_g$. The one or more guard signals are then wavelength-division multiplexed along with a signal, generating a wavelength-division multiplexed signal. The wavelength-division multiplexed signal includes a multiplexed guard power amplitude $A'_g$. Then the multiplexed guard power amplitude $A'_g$ is detected and an error rate of the multiplexed guard channel is determined.

The signal that is wavelength-division multiplexed with the one or more guard signals may be a wavelength-division multiplexed signal that includes at least one power amplitude at a channel; and the guard wavelength $\lambda_g$, being different from the channel.

In another embodied method, a first objective signal and a second objective signal are generated, the first objective signal including a first objective wavelength and the second objective signal including a second objective wavelength. A guard signal is generated, including a guard wavelength. The guard wavelength is within a range defined by a guard channel. The guard channel includes a range of wavelengths that is between the first objective wavelength $\lambda_{o1}$ and the second objective wavelength $\lambda_{o2}$. The first and second objective signals and the guard signal are wavelength-division multiplexed to generate a wavelength-division multiplexed signal. The wavelength-division multiplexed signal includes channels (or wavelengths) at which the data from the first and second objective signals and the guard signal are assigned. The first objective signal, the second objective signal, and the guard signal are assigned to a first multiplexed objective channel, a second multiplexed objective channel, and a multiplexed guard channel, respectively. The wavelength-division multiplexed signal is received by a monitor and then the error rate of the multiplexed guard channel is determined.

The determination of the error rate of the multiplexed guard channel can include, for example, a method of calculating the bit error rate (BER) of the multiplexed guard channel, or a method of calculating the signal-to-noise ratio (SNR) of the multiplexed guard channel.

The first objective signal may further include a first objective power amplitude $A_{o1}$, and the guard signal may further include a predetermined guard power amplitude $A_g$, wherein $A_g$ is less than $A_{o1}$.

While it is advantageous to have a low error rate for multiplexed objective signals, it is desirable to have a measurable amount of error rate for the multiplexed guard signals.

Accordingly, methods may be employed so that for the multiplexed guard signals, error rate would be enhanced. One possible method is to have a lower multiplexed guard power amplitude $A_g$. Preferably, the multiplexed guard power amplitude $A_g$ is less than or equal to 50% of $A_{o1}$.

The determination of the error rate of the multiplexed guard channel may include a method of comparing the guard power amplitude $A_g$ of the guard signal to the multiplexed guard power amplitude $A'_g$ of the multiplexed guard channel, to determine an error guard power $\Delta A_g$, wherein $\Delta A_g$ is a mathematical function of $A'_g$ and $A_g$.

The guard channel may include an action protocol associated to the multiplexed guard channel. Preferably, the guard channel includes an action protocol associated to each of the multiplexed guard channels. An action protocol may include, for example, a predetermined criterion wherein if an error rate at the guard wavelength is determined to meet a certain threshold, then an output is generated according to the action protocol. For example, the output may be a recommendation for a system inspection. Preferably, an output recommending a system inspection includes when to perform the system inspection, such as within a certain time period (e.g. X hours, Y minutes) and/or a fixed determined time (year, month, date, hour, etc.). Preferably, an action protocol may include a predetermined criteria for certain wavelength wherein an output is a system malfunction alert indicating that an immediate attention to the system is required and/or a system shutdown is required.

In another embodiment, the method for monitoring a WDM signal further comprises generating a second guard signal. The second guard signal includes a second guard wavelength $\lambda_{g2}$ of the guard channel, wherein the second guard wavelength $\lambda_{g2}$ is selected according to a channel hopping protocol. Then generating a second wavelength-division multiplexed signal, wherein the first objective signal, the second objective signal, and the second guard signal are wavelength-division multiplexed. The second wavelength-division multiplexed signal includes the first multiplexed objective channel, the second multiplexed objective channel, and a second multiplexed guard channel. The second wavelength-division multiplexed signal is received by a monitor and then a second error rate of the second multiplexed guard channel is determined.

Preferably, the channel hopping protocol includes selecting the second guard wavelength $\lambda_{g2}$ from a predetermined set of guard channel wavelengths $\lambda_1$ to $\lambda_N$ ($N \geq 2$).

The channel hopping protocol may include selecting the second guard wavelength $\lambda_{g2}$ randomly from a predetermined set of guard channel wavelengths $\lambda_1$ to $\lambda_N$ ($N \geq 2$). The term "randomly" includes a method of calling a random number generator from a computer or a computing device.

The channel hopping protocol may include time variably selecting the second guard wavelength $\lambda_{g2}$ from the guard channel. Time variably selecting a wavelength may include a resulting wavelength from a calculation of a mathematical equation that is a function of the time variable.

In another embodied method for monitoring a WDM signal, the method comprises generating one or more guard signal(s) $G_i$, wherein i=1 to N, and $N \geq 1$. Each guard signal includes a guard wavelength $\lambda_i$ and a predetermined guard power amplitude $A_i$. One or more objective signal(s) $S_j$ are also generated, wherein j=1 to M, and $M \geq 1$. Each objective signal includes an objective signal wavelength $\lambda_j$. Then, the guard signal(s) and the objective signal(s) are wavelength-division multiplexed, generating a wavelength-division multiplexed signal, wherein the wavelength-division multiplexed signal includes a multiplexed guard channel for each $\lambda_i$. Then an error rate $E_i$ of the multiplexed guard channel at channel $\lambda_i$ are determined. The determination of the error rate includes, for example, a method of calculating the bit error rate (BER) of the multiplexed guard channel and/or a method of calculating the signal-to-noise ratio (SNR) of the multiplexed guard channel. Other possible methods would be recognized to those skilled in the art.

A system for monitoring a WDM signal comprises, for example, a first node that generates a first objective signal for carrying data, a second node that generates a second objective signal for carrying data, and a guard channel monitor that generates a guard signal. The system also includes a central hub configured to receive the first objective signal, the second objective signal, and the guard signal. The central hub is configured to generate a multiplexed signal by wavelength-division multiplexing the first objective signal, the second objective signal, and the guard signal. Further, the central hub may be configured to send the multiplexed signal to the guard channel monitor, wherein the guard channel monitor is configured to compare the guard signal to the multiplexed signal at a predetermined wavelength. Comparing the guard signal to the multiplexed signal includes, for example, determining an error rate using methods of calculating BER and/or SNR.

Preferably, the central hub is a star coupler, such that the system has a star topology network. Even more preferably, the star coupler is a passive star coupler.

DETAILED DESCRIPTION

The term "wavelength-division multiplexing" is defined herein to include frequency division multiplexing (FDM). The term "signal" is defined to include electromagnetic radiation signals. Electromagnetic radiation signals include, for example, optical signals and radio signals. On a waveform, the term "signal" may also describe portions of the waveform that carries data. For example, in a wavelength-division multiplexed signal having a particular waveform having multiple peaks in amplitude, each of the peaks may be described as "signals" wherein each of the signals may also be described to have a channel, a carrier frequency, or associated wavelength. The term "signal drift" is defined herein to include carrier frequency drift. Objective signal, also known in the art as primary signal, is defined herein to include radio frequency signals that carry data. A guard signal may also carry data. The term channel describes a wavelength. Power amplitude is defined herein as a measurable strength of an electromagnetic signal. A measurable strength includes a magnitude of a signal. A measurable strength includes measuring an error rate. Error rate includes, for example, bit error rate (BER) and/or signal-to-noise ratio (SNR). Error guard power is defined as a measurable deviation of a measurable strength of a signal or a channel, wherein the measurable deviation is determined by a mathematical comparison involving power amplitudes of signal(s) and/or channel(s). The terms power amplitude, power, amplitude, and magnitude may be used interchangeably. A channel is defined as a particular wavelength or a range of wavelengths. Since frequency is inversely related to wavelength, features used to describe or associated with frequency are also associated with wavelength. One of ordinary skill in the art would recognize that the terms frequency and wavelength may be used equivalently and/or interchangeably. A Fourier transformed signal or waveform may be assumed to be substantially Gaussian shape. Accordingly, wavelength includes a wavelength of a signal defined to be the wavelength at maximum power of a signal, or substantially near the wavelength at maximum power of the signal. Maximum power is the peak amplitude of a waveform. Substantially near is defined to be within one a deviation from the center of a substantially Gaussian shape. Accordingly, the description "substantially near the wavelength at maximum power of the signal" includes a range of $2\sigma$.

FIGS. 1-10 are illustrations of various embodiments and/or not-to-scale examples.

Figure 1:
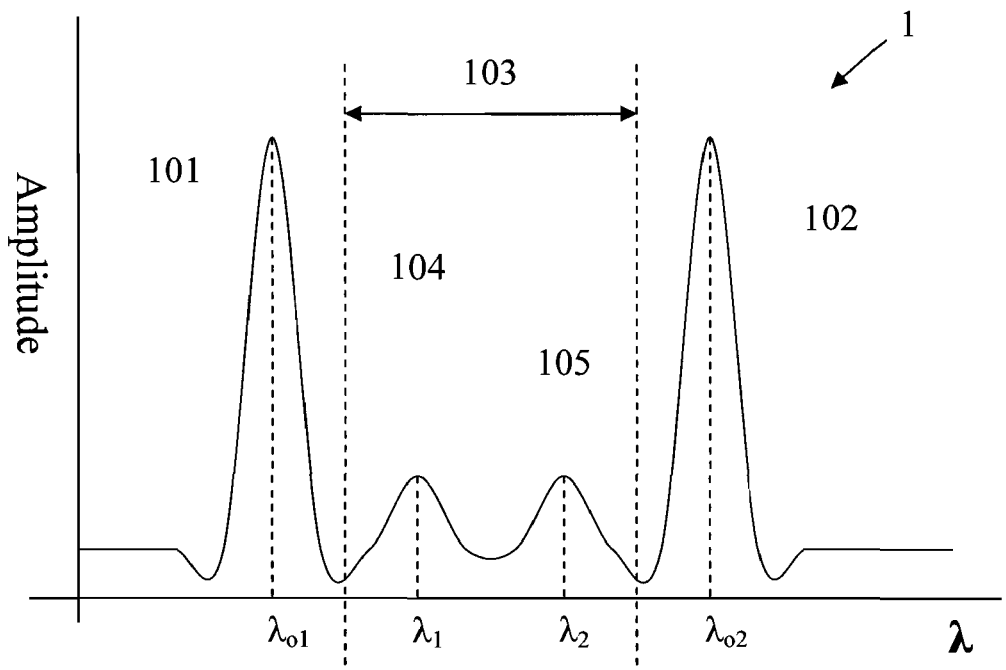
FIG. 1 shows an illustration of a wavelength-division multiplexed waveform.

FIG. 1 shows an example of a wavelength-division multiplexed waveform 1. The WDM waveform 1 is generated by wavelength-division multiplexing two objective signals and two guard signals so that the WDM waveform 1 has objective signals at channels $\lambda o_1$ and $\lambda o_2$, and two guard signals at channels, $\lambda_1$ and $\lambda_2$. A first multiplexed objective signal 101 and a second multiplexed objective signal 102 are separated by a certain range in wavelength, so that the two signals 101, 102 are immediate neighbor signals at different channels, $\lambda o_1$ and $\lambda o_2$. A guard channel 103 is provided between $\lambda o_1$ and $\lambda o_2$ of the first objective channel 101 and the second objective channel 102 defined as a general range of channels. In this example, the guard channel 103 includes two multiplexed guard signals 104, 105 at channels $\lambda_1$ and $\lambda_2$, respectively. Accordingly, the multiplexed guard signals 104, 105 have channels that are between the wavelengths of the first multiplexed objective signal 101 and the second multiplexed objective signal 102. The waveform 1 illustrated in FIG. 1 shows a state in which a significant signal drift is not detected, as neither of the multiplexed objective signals 101, 102 have drifted into the guard channel 103 to measurably affect the multiplexed guard signals 104, 105. Accordingly, an error rate of the multiplexed guard signals 104, 105 would meet a satisfactory condition.

Figure 2:
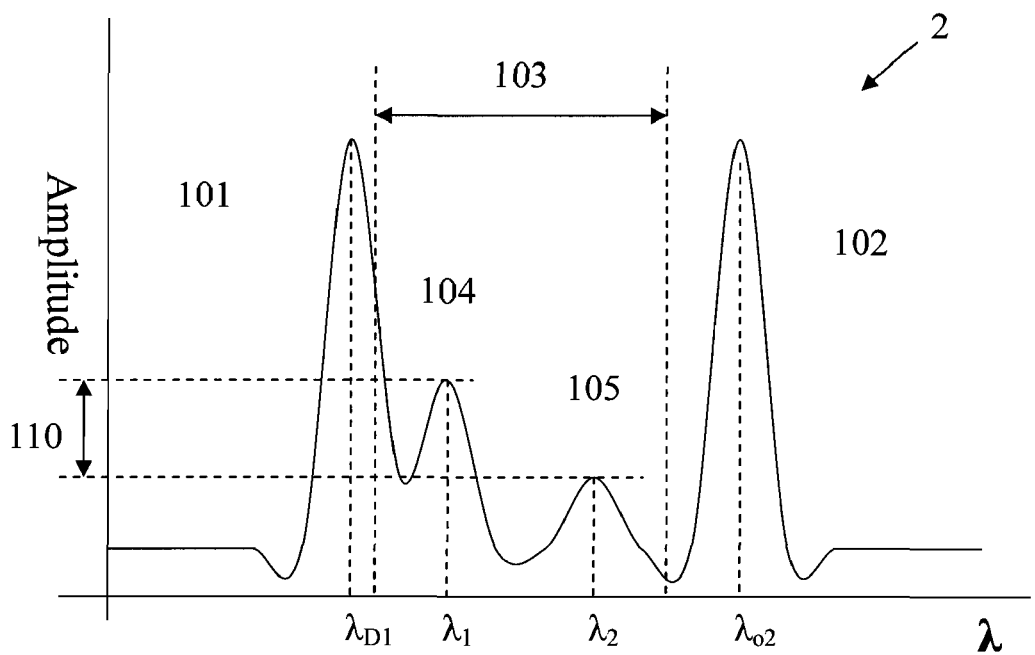
FIG. 2 shows an illustration of a wavelength-division multiplexed waveform with a detectable signal drift.

FIG. 2 shows an example of a wavelength-division multiplexed waveform 2 similar to the waveform 1 shown in FIG. 1, except that the first multiplexed objective signal 101 has drifted to channel $\lambda_{D1}$ so that the curvature of the signal's waveform, that indicates a measurable amplitude of the signal, has drifted into the guard channel 103. FIG. 2 shows that the signal drift of the first multiplexed objective signal 101 towards the channel of the first multiplexed guard signal 104 measurably affects the multiplexed guard signal 104. For example, for an optical signal, leakage of photons from the first multiplexed objective signal 101 to the first multiplexed guard signal 104 may cause a detectable and measurable increase in an error rate 110. The error rate 110 may be determined by measuring a bit error rate (BER). Alternatively or inclusively, the error rate 110 may be determined by measuring a signal-to-noise ratio (SNR). The error rate 110 may also be determined by comparison of the power amplitude $A_g$ of the outgoing guard signal to the power amplitude $A'_g$ of the receiving multiplexed guard signal. In FIG. 2, the first multiplexed guard signal 104 has been illustrated to show the error rate 110 in a simplified manner to generally show that the first multiplexed guard signal 104 is somehow measurably affected by the drifting first objective signal 101.

Figure 3:
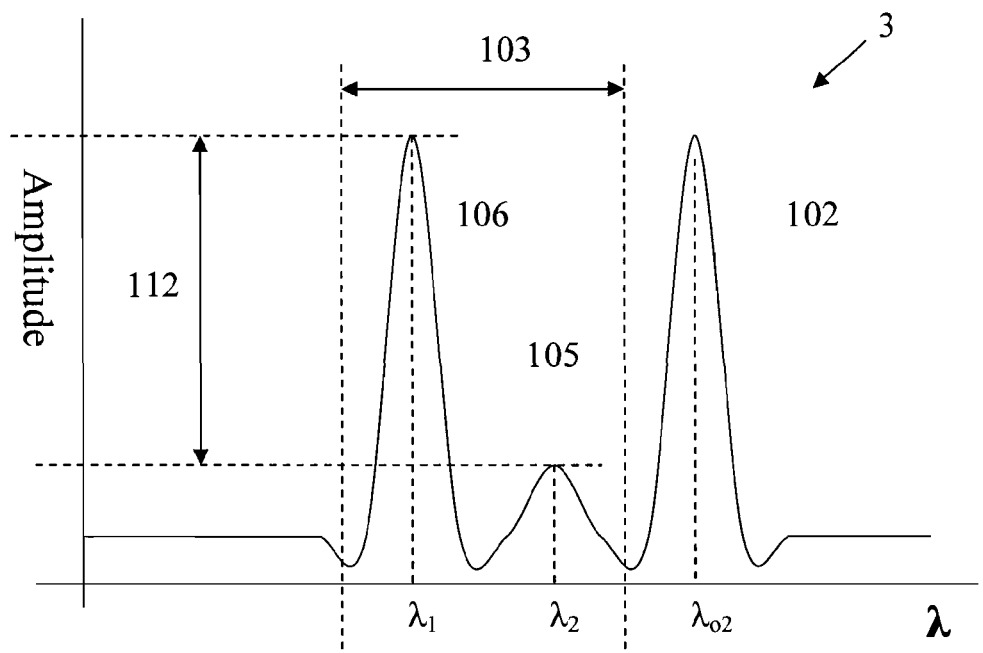
FIG. 3 shows an illustration of a wavelength-division multiplexed waveform with a detectable signal drift.

FIG. 3 shows another example of a wavelength-division multiplexed waveform 3 similar to that shown in FIGS. 1 and 2, wherein a first objective signal 101, shown in FIGS. 1 and 2, has drifted further into the guard channel 103 such that the first objective signal 101 has occupied the first multiplexed guard channel $\lambda_1$, generating a superposed signal 106. The superposed signal 106 superposes the power of the first objective signal 101 with the first multiplexed guard signal 104, at the first multiplexed guard channel $\lambda_1$. The superposed signal 106 would cause a substantially detectable and measurable increase in an error rate 112. Moreover, further drift of the first objective signal 101 towards its immediate neighbor signal, the second multiplexed objective signal 102, although not shown, would be detected by an increase in the error rate of the second multiplexed guard signal 105 with a reduction in the error rate at the first multiplexed guard channel $\lambda_1$. Thus, the direction of the drift may be detected.

Figure 4:
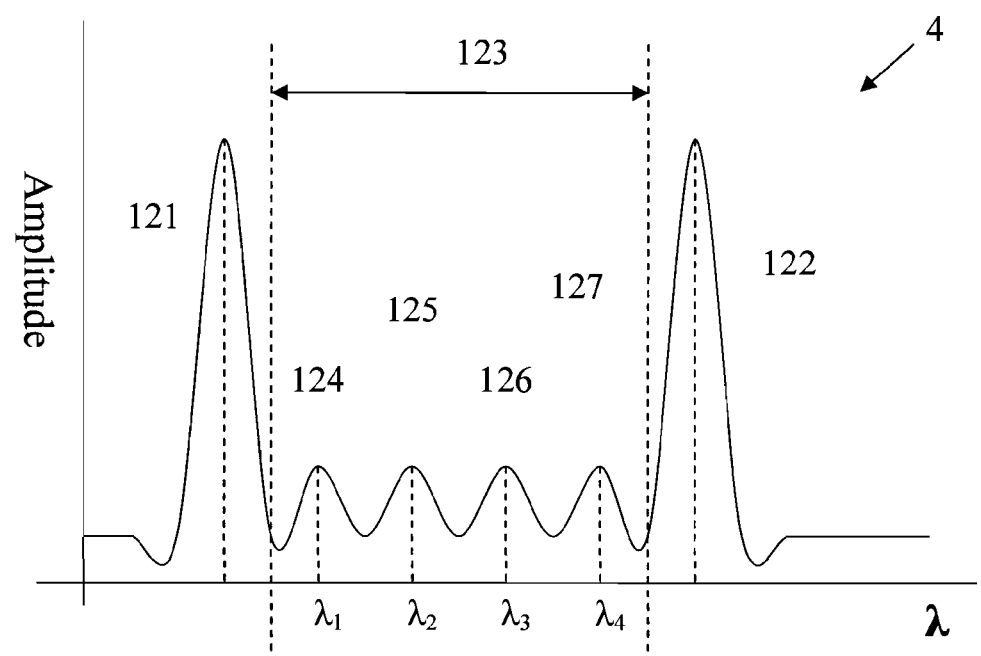
FIG. 4 shows an illustration of a wavelength-division multiplexed waveform.

FIG. 4 shows another example of a wavelength-division multiplexed waveform 4. The wavelength-division multiplexed waveform 4 is generated by wavelength-division multiplexing two objective signals and four guard signals. A first multiplexed objective signal 121 and a second multiplexed objective signal 122 are separated by a certain range in wavelength, so that the two signals 121, 122 are immediate neighbor signals at different channels or wavelengths. A guard channel 123 is provided between the wavelengths of the first objective channel 121 and the second objective channel 122 defined as a general range of channels. In this example, the guard channel 123 includes four multiplexed guard signals 124, 125, 126, 127. Accordingly, the multiplexed guard signals 124, 125, 126, 127 have channels that are between the wavelengths of the first multiplexed objective signal 121 and the second multiplexed objective signal 122.

The guard channel 123 may include at least one action protocol associated to at least one of the multiplexed guard signals 124, 125, 126, 127. For example, an action protocol may include a predetermined criterion wherein if an error rate for the first multiplexed guard signal 124 meets a predetermined threshold then an output is generated. For example, the output may be a recommendation for a system inspection. Preferably, an output recommending a system inspection includes when to perform the system inspection, such as within a certain time period (e.g. X hours, Y minutes) and/or a fixed determined time (year, month, date, hour, etc.). The action protocol may further include, for example, another predetermined criteria wherein if an error rate for the second multiplexed guard signal 125 meets a predetermined threshold then an output is generated wherein reporting a system malfunction alert that communicates that an immediate attention to the system is required and/or recommend a system shutdown.

The waveform 4 illustrated in FIG. 4 shows a state in which a significant signal drift is not detected, as neither of the multiplexed objective signals 121, 122 have drifted into the guard channel 123 to measurably affect the multiplexed guard signals 124, 125, 126, 127. Accordingly, an error rate of the multiplexed guard signals 124, 125, 126, 127 would meet a satisfactory condition. Thus, according to an action protocol example, no output would be generated.

Figure 5:
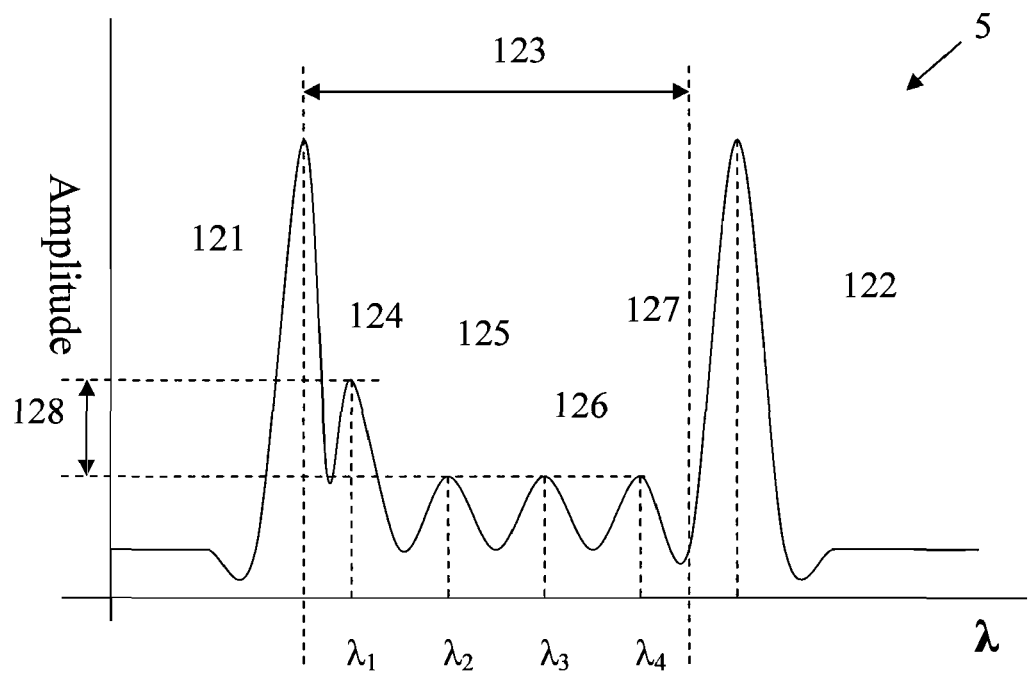
FIG. 5 shows an illustration of a wavelength-division multiplexed waveform with a detectable signal drift.

FIG. 5 shows an example of a wavelength-division multiplexed waveform 5 similar to the waveform 4 shown in FIG. 4, except that the first multiplexed objective signal 121 has drifted into the guard channel 123. FIG. 5 shows that the signal drift of the first multiplexed objective signal 121 towards the channel of the first multiplexed guard signal 124 measurably affects the multiplexed guard signal 124 to cause a detectable and measurable increase in an error rate 128. The error rate 128 may be determined by measuring a bit error rate (BER), a signal-to-noise ratio (SNR), or a comparison of the power amplitude $A_g$ of the outgoing guard signal to the power amplitude $A'_g$ of the receiving multiplexed guard signal. The error rate 128 is illustrated in a simplified manner to generally show that the first multiplexed guard signal 124 is somehow measurably affected by the drifting first objective signal 121. Moreover, for the detected signal drift shown in FIG. 5 and according to an action protocol example, an output may be a recommendation for a system inspection that may also include when to perform the system inspection.

Figure 6:
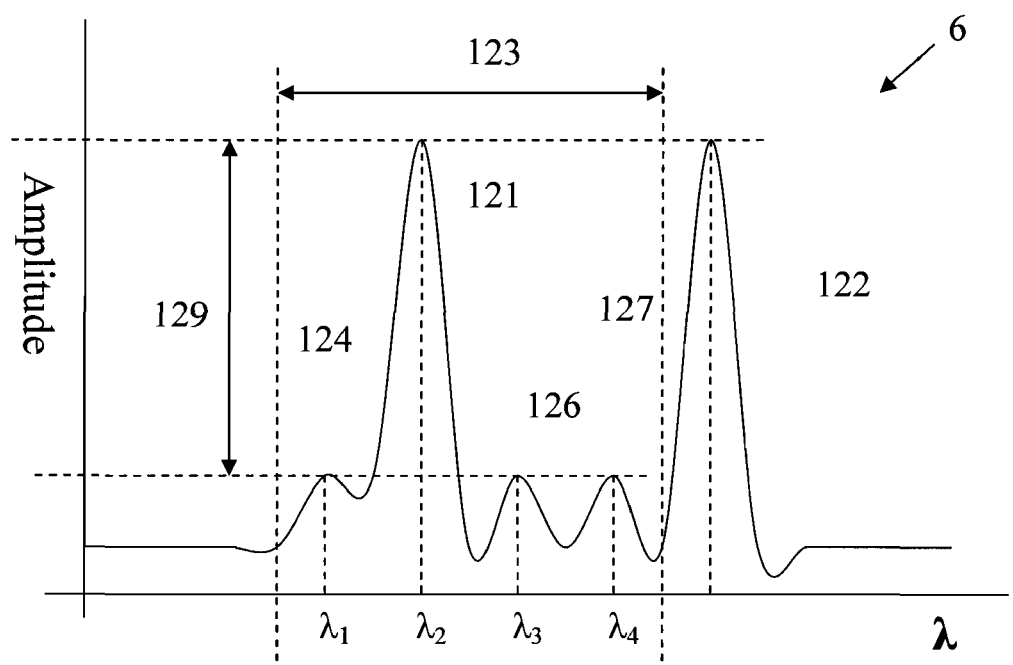
FIG. 6 shows an illustration of a wavelength-division multiplexed waveform with a detectable signal drift.

FIG. 6 shows another example of a wavelength-division multiplexed waveform 6 similar to that shown in FIGS. 4 and 5, wherein a first objective signal 121 has drifted further into the guard channel 123 such that the first objective signal 121 has occupied the second multiplexed guard channel $\lambda_2$. The occupation of the first objective signal 121 at the second multiplexed guard channel $\lambda_2$ would cause a substantially detectable and measurable increase in an error rate 129. Further drift of the first objective signal 121 towards its immediate neighbor signal, the second multiplexed objective signal 122, would be detected by an increase in the error rate of the third multiplexed guard signal 125 with a reduction in the error rate of the first multiplexed guard signal 124. Thus, the direction of the drift may be detected. Moreover, for the detected signal drift shown in FIG. 6 and according to an action protocol example, an output may be a stronger recommendation for a system inspection or an output indicating that a previously detected problem may be worsening.

FIGS. 4 to 6 and the associated detection and/or measurements of error rates of the guard channel 123 would also indicate the direction of the signal drift and which multiplexed objective signal is being affected by the signal drift.

Further, if the error rate of the fourth multiplexed guard signal 127 meets a certain condition and further the direction of the drift has been detected that indicates that it is the first multiplexed objective signal that is drifting towards the second multiplexed objective signal, then according to an action protocol, an output reporting a system malfunction alert that communicates that an immediate attention to the system is required and/or recommend a system shutdown.

Figure 7:
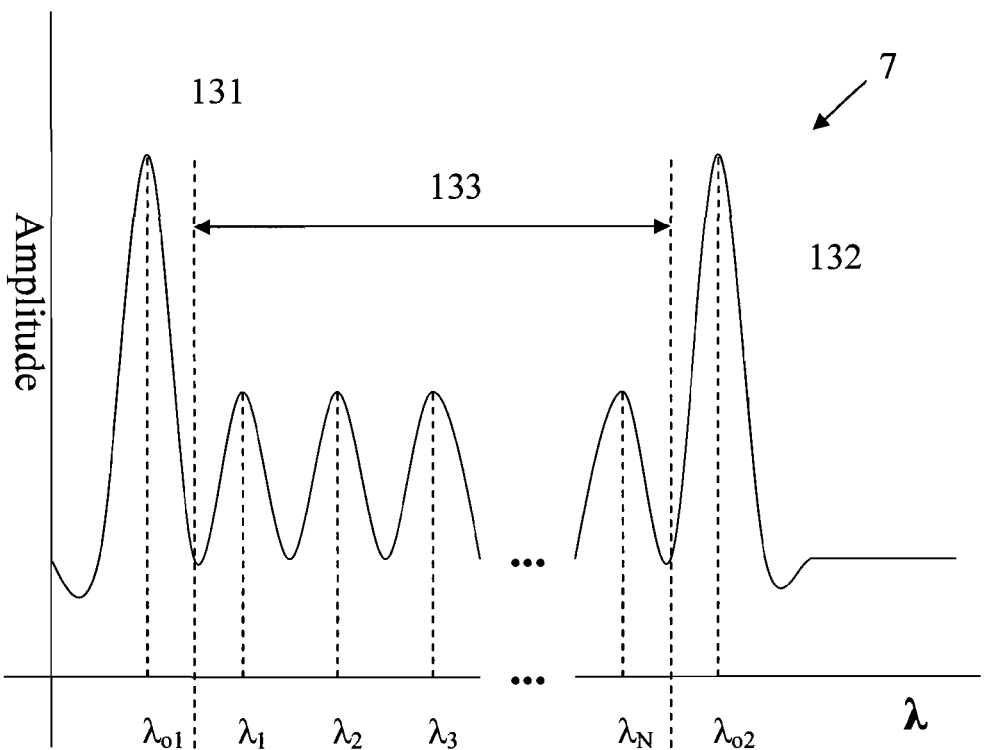
FIG. 7 shows an illustration of a wavelength-division multiplexed waveform.

FIG. 7 illustrates an example of a waveform-division multiplexed waveform 7 wherein between two multiplexed objective signals 131, 132, a guard channel 134 having a plurality of multiplexed guard signals are included. The guard channel 134 may include predetermined channels $\lambda_i$, wherein i=1 to N.

Figure 8:
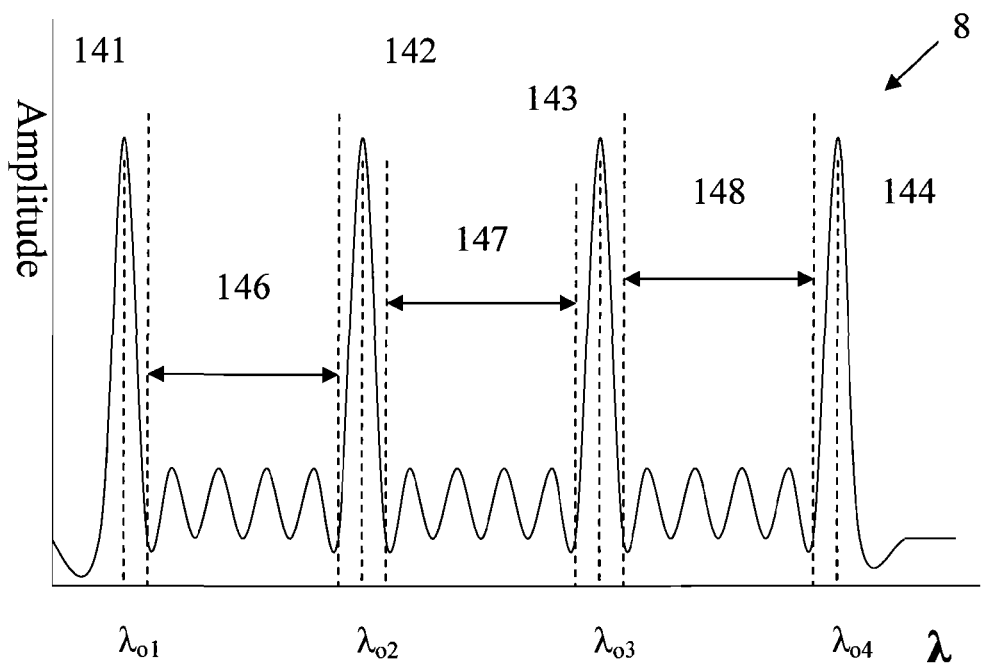
FIG. 8 shows an illustration of a wavelength-division multiplexed waveform.

FIG. 8 illustrates an example of a waveform-division multiplexed waveform 8 wherein between multiple multiplexed objective signals 141, 142, 143, 144, multiple guard channels 146, 147, 148 having a plurality of multiplexed guard signals are included. A guard channel is provided between each pair of the multiplexed objective signals. For example, FIG. 8 shows that the guard channel 146 is between multiplexed objective signals 141 and 142. The guard channel 147 is between multiplexed objective signals 142 and 143. The guard channel 148 is between multiplexed objective signals 143 and 144. Although FIG. 8 shows four multiplexed guard signals in each of the guard channels 146, 147, 148, the number of multiplexed guard signals in each of the guard channels may vary. Further, the guard channels may not necessarily include the same uniform number of guard signals.

The number of guard signals in a guard channel may be one or more. For example, the multiplexed waveforms illustrated in FIGS. 1-8 show examples wherein there are at least two guard signals per guard channel. However, using a device configured to generate a guard signal that can vary in wavelength, such as for example a tunable laser, a single guard signal may use a channel hopping technique to cover multiple wavelengths of a guard channel. Channel hopping is a technique wherein a single signal output device can vary the signal's wavelength among multiple channels. An example of this method is illustrated in FIGS. 9A, 9B, and 9C.

Figure 9A:
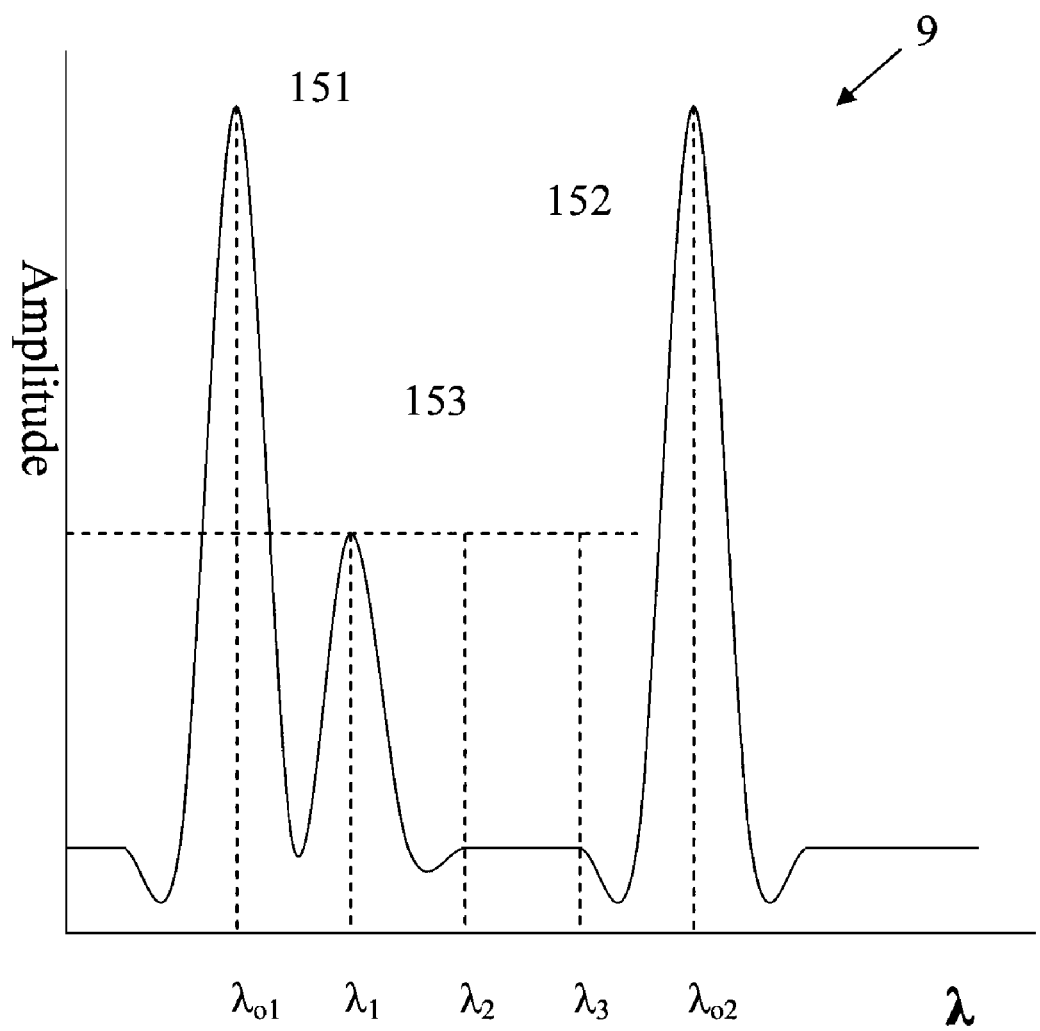
FIG. 9A shows an illustration of a first wavelength-division multiplexed waveform using a channel hopping technique.

FIG. 9A shows an example of a wavelength-division multiplexed waveform 9. The wavelength-division multiplexed waveform 9 is generated by wavelength-division multiplexing two objective signals and a guard signal according to an example of a channel hopping protocol. A first multiplexed objective signal 151 is at channel $\lambda_{o1}$ and a second multiplexed objective signal 152 is at channel $\lambda_{o2}$. A multiplexed guard signal 153 is provided between $\lambda_{o1}$ and $\lambda_{o2}$ at wavelength $\lambda_1$.

Figure 9B:
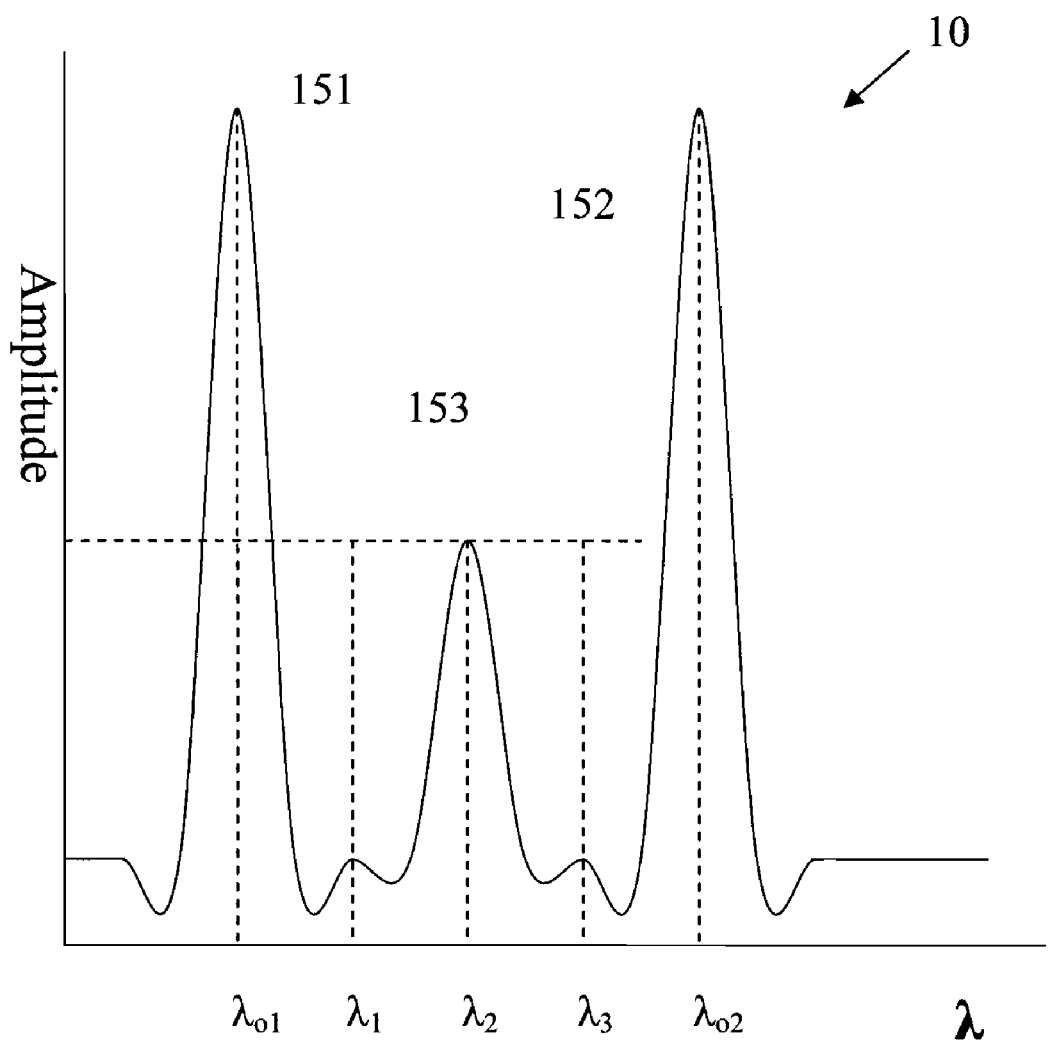
FIG. 9B shows an illustration of a second wavelength-division multiplexed waveform using a channel hopping technique.

FIG. 9B shows an example of a wavelength-division multiplexed waveform 10. The wavelength-division multiplexed waveform 10 is generated by wavelength-division multiplexing two objective signals and a guard signal according to an example of a channel hopping protocol. A multiplexed guard signal 153 is provided between $\lambda_{o1}$ and $\lambda_{o2}$ at wavelength $\lambda_2$.

Figure 9C:
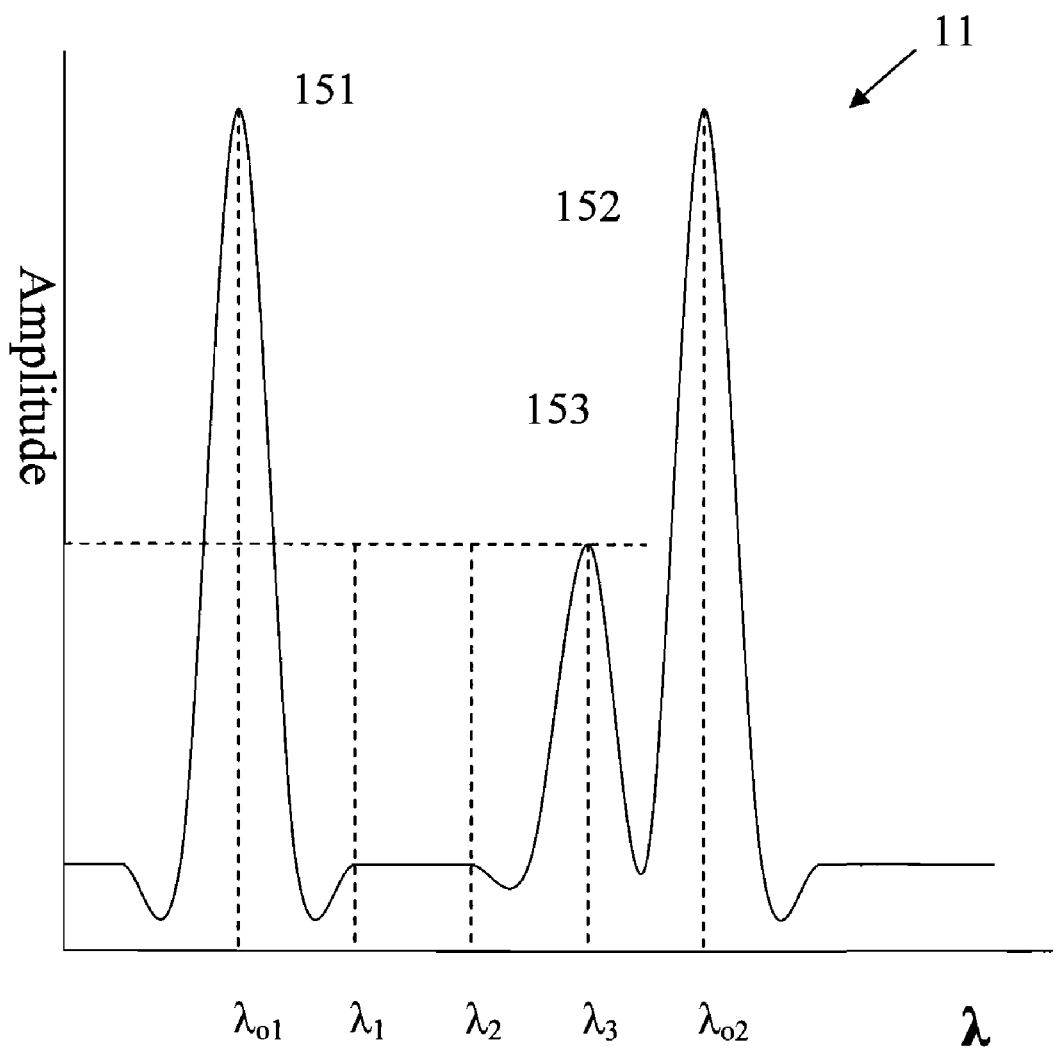
FIG. 9C shows an illustration of a third wavelength-division multiplexed waveform using a channel hopping technique.

FIG. 9C shows an example of a wavelength-division multiplexed waveform 11. The wavelength-division multiplexed waveform 11 is generated by wavelength-division multiplexing two objective signals and a guard signal according to an example of a channel hopping protocol. A multiplexed guard signal 153 is provided between $\lambda_{o1}$ and $\lambda_{o2}$ at wavelength $\lambda_3$.

An example of a channel hopping protocol includes a fixed sequence of changing the wavelength of the guard signal between wavelengths, such as $\lambda_1$ to $\lambda_2$ to $\lambda_3$ and back to $\lambda_1$ to repeat the sequence for a method using three guard signals in the guard channel. The number of guard signals and wavelengths in the guard channel, and the specific sequence of the change in wavelengths may be selected according to the needs of a particular system. Other possible channel hopping protocols include varying the guard wavelength $\lambda_{gi}$ from a predetermined set of guard channel wavelengths $\lambda_1$ to $\lambda_N$ (N≧2). Alternative channel hopping protocol includes varying the guard wavelength $\lambda_{gi}$ from a predetermined set of guard channel wavelengths $\lambda_1$ to $\lambda_N$ (N≧2) following a set pattern. Another channel hopping protocol includes selecting a guard wavelength $\lambda_{gi}$ randomly from a predetermined set of guard channel wavelengths $\lambda_1$ to $\lambda_N$ (N≧2). The channel hopping protocol may include time variably selecting the second guard wavelength $\lambda_{gi}$ from the guard channel. Time variably selecting a wavelength includes a resulting wavelength from a calculation of a mathematical equation that is a function of the time variable. Accordingly, more than one tunable laser may be used in accordance to one or more channel hopping protocol(s) to cover a wide range of wavelengths within a guard channel.

Figure 10:
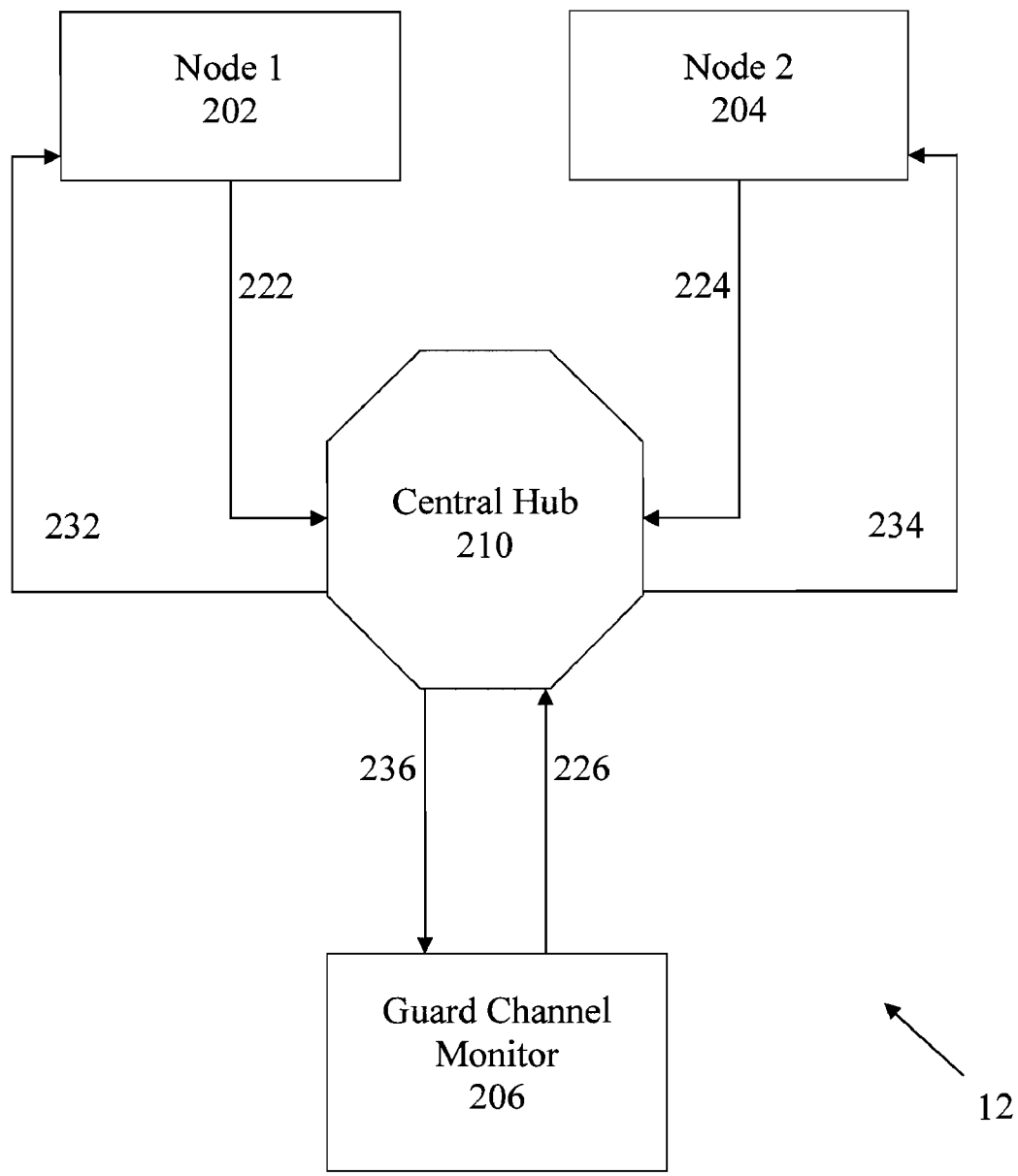
FIG. 10 shows an example of a system including a star topology network.

FIG. 10 shows a system for monitoring a WDM signal. The system comprises a "Node 1" 202 that generates a first objective signal for carrying data, "Node 2" 204 that generates a second objective signal for carrying data, and a Guard Channel Monitor 206 that generates a guard signal. The system also includes a Central Hub 210 configured to receive the first objective signal, the second objective signal, and the guard signal. The first objective signal is sent from the "Node 1" 202 to the Central Hub 210 along a communication pathway 222. The second objective signal is sent from the "Node 2" 204 to the Central Hub 210 along a communication pathway 224. The guard signal is sent from the Guard Channel Monitor 206 to the Central Hub 210 along a communication pathway 226. The Central Hub 210 receives the signals to generate a multiplexed signal by wavelength-division multiplexing the first objective signal, the second objective signal, and the guard signal. The wavelength-division multiplexed signal is sent to the guard Channel Monitor 206 along a communication pathway 236. The wavelength-division multiplexed signal may also be sent to "Node 1" 202 and "Node 2" 204 along communication pathways 232 and 234, respectively. The Guard Channel Monitor 206 is configured to compare the guard signal to the wavelength-division multiplexed signal at a predetermined wavelength. Comparing the guard signal to the wavelength-division multiplexed signal includes, for example, determining an error rate using methods of calculating BER and/or SNR. Preferably, the Central Hub 210 is a star coupler. Even more preferably, the Central Hub 210 is a passive star coupler. Preferably, the communication pathways 222, 224, 226, 232, 234, 236 are optical fibers. Preferably, the signals are optical signals.

Preferred embodiments have been described. Those skilled in the art will appreciate that various modifications and substitutions are possible, without departing from the scope of the invention as claimed and disclosed, including the full scope of equivalents thereof.

What is claimed is:

1. A method for monitoring a wavelength-division multiplexed signal, comprising:
   generating a first objective signal including a first objective wavelength $\lambda_{o1}$,
   generating a second objective signal including a second objective wavelength $\lambda_{o2}$,
   selecting a guard wavelength $\lambda_g$ according to a channel hopping protocol wherein the guard wavelength $\lambda_g$ varies between $\lambda_{o1}$ and $\lambda_{o2}$, and generating a guard signal including the guard wavelength $\lambda_g$ that is between $\lambda_{o1}$ and $\lambda_{o2}$;
   generating a wavelength-division multiplexed signal by wavelength-division multiplexing the first objective signal, the second objective signal, and the guard signal, wherein the wavelength-division multiplexed signal includes:
      a first multiplexed objective channel,
      a second multiplexed objective channel, and
      a multiplexed mud channel having a range of wavelengths between $\lambda_{o1}$ and $\lambda_{o2}$;
   receiving the wavelength-division multiplexed signal by a monitor; and
   determining an error of the multiplexed guard channel by comparing the multiplexed guard channel to the guard signal.

2. The method for monitoring a wavelength-division multiplexed signal according to claim 1, wherein the channel hopping protocol includes selecting the guard wavelength $\lambda_g$ from a predetermined set of guard channel wavelengths $\lambda_1$ to $\lambda_N$ (N≧2).

3. The method for monitoring a wavelength-division multiplexed signal according to claim 1, wherein the channel hopping protocol includes selecting the guard wavelength $\lambda_g$ randomly from a predetermined set of guard channel wavelengths $\lambda_1$ to $\lambda_N$ (N≧2).

4. The method for monitoring a wavelength-division multiplexed signal according to claim 1, wherein the channel hopping protocol includes time variably selecting the guard wavelength $\lambda_g$.

5. A system for monitoring a wavelength-division multiplexed signal, comprising:
   a first node that generates a first objective signal for carrying data;
   a second node that generates a second objective signal for carrying data;
   a guard channel monitor that generates a guard signal having a predetermined wavelength;
   a central hub configured to receive the first objective signal, the second objective signal, and the guard signal, and configured to wavelength-division multiplex the first objective signal, the second objective signal, and the guard signal to generate a multiplexed signal, and configured to send the multiplexed signal to the guard channel monitor, the multiplexed signal has a range of wavelengths that includes the predetermined wavelength; and
   the guard channel monitor configured to compare the guard signal to the multiplexed signal at the predetermined wavelength.

6. The system for monitoring a wavelength-division multiplexed signal according to claim 5, wherein the central hub is a star coupler.

7. The system for monitoring a wavelength-division multiplexed signal according to claim 6, wherein the star coupler is a passive star coupler.

8. A method for monitoring a wavelength-division multiplexed signal, comprising:
   generating from a first node, a first objective signal for carrying data;
   generating from a second node, a second objective signal for carrying data;
   generating from a guard channel monitor, a guard signal having a predetermined wavelength;
   receiving by a central hub, the first objective signal, the second objective signal, and the guard signal, and generating a multiplexed signal by wavelength-division multiplexing the first objective signal, the second objective signal, and the guard signal, and sending the multiplexed signal to the guard channel monitor, the multiplexed signal has a range of wavelengths that includes the predetermined wavelength; and the guard channel monitor receiving the multiplexed signal, and comparing the guard signal to the multiplexed signal at the predetermined wavelength.

9. The method according to claim 8, further comprising:

determining a direction of a signal drift of the first objective signal by comparing the guard signal to the multiplexed signal at the predetermined wavelength.

* * * * *